United States Patent [19]
Tamir et al.

[11] Patent Number: 5,923,365
[45] Date of Patent: *Jul. 13, 1999

[54] SPORTS EVENT VIDEO MANIPULATING SYSTEM FOR HIGHLIGHTING MOVEMENT

[75] Inventors: Michael Tamir, Tel Aviv; Avi Sharir, Ramat Hasharon, both of Israel

[73] Assignee: Orad Hi-Tech Systems, Ltd, Ra'anana, Israel

[ * ] Notice: This patent issued on a continued prosecution application filed under 37 CFR 1.53(d), and is subject to the twenty year patent term provisions of 35 U.S.C. 154(a)(2).

[21] Appl. No.: 08/762,198

[22] Filed: Dec. 6, 1996

Related U.S. Application Data

[63] Continuation of application No. 08/134,309, Oct. 12, 1993, abandoned.

[51] Int. Cl.⁶ .................................................. H04N 5/262
[52] U.S. Cl. ........................ 348/169; 348/157; 348/171; 348/172; 348/578; 348/579; 382/103
[58] Field of Search .................................. 348/169, 170, 348/171, 172, 571, 578, 135, 157, 579, 586, 589, 590, 598, 600; 382/103

[56] References Cited

U.S. PATENT DOCUMENTS

| | | | |
|---|---|---|---|
| 3,944,738 | 3/1976 | Johnson | 348/157 |
| 4,064,528 | 12/1977 | Bowerman | 348/578 |
| 4,179,704 | 12/1979 | Moore et al. | 348/157 |
| 4,566,126 | 1/1986 | Miyagawa et al. | 382/48 |
| 4,569,079 | 2/1986 | Yoshida | 382/1 |
| 4,667,236 | 5/1987 | Dresdner | 348/590 |
| 4,811,084 | 3/1989 | Belmares-Sarabia et al. | 348/592 |
| 4,875,097 | 10/1989 | Jackson | 348/585 |
| 4,947,256 | 8/1990 | Wood et al. | 348/578 |
| 4,949,165 | 8/1990 | Riemann et al. | 348/182 |
| 4,979,021 | 12/1990 | Thomas | 348/578 |
| 5,012,334 | 4/1991 | Etra | 348/107 |
| 5,046,165 | 9/1991 | Pearman et al. | 348/590 |
| 5,058,189 | 10/1991 | Kanno | 382/61 |
| 5,060,068 | 10/1991 | Lindstrom | 348/6 |
| 5,067,014 | 11/1991 | Bergen et al. | 382/54 |
| 5,077,608 | 12/1991 | Dubner | 348/583 |
| 5,109,482 | 4/1992 | Bohrman | 395/154 |
| 5,126,847 | 6/1992 | Kori et al. | 348/239 |

(List continued on next page.)

FOREIGN PATENT DOCUMENTS

| | | | |
|---|---|---|---|
| WO 93/06691 | 4/1983 | WIPO | H04N 5/275 |
| WO 93/02524 | 2/1993 | WIPO | H04N 9/74 |

OTHER PUBLICATIONS

Canny J., "A Computational Approach to Edge Detection", IEEE Trans. Pattern Analysis and Machine Intelligence, 1986, pp. 679–698.

Gonzalez et al, "Digital Image Processing", Addison–Wesly, pp. 200–207, 1977.

Haralick R., "Digital Step Edges from Zero Crossing of Second Directional Derivatives", IEEE Trans. on Pattern Analysis and Machine Intelligence, vol. 6, No. 1, pp. 58–68, 1984.

Shanmugam et al, "An Optimal Frequency Domain Filter for Edge Detetection in Digital Pictures", IEEE Trans. Pattern Analysis and Machine Intelligence, vol. 1, No. 1, pp. 37–49, 1979.

*Primary Examiner*—Bryan Tung
*Assistant Examiner*—Vu Le
*Attorney, Agent, or Firm*—Woodcock Washburn Kurtz Mackiewicz & Norris, LLP

[57] ABSTRACT

A sports event video manipulating system for manipulating a representation of a sports event, the sports editor including a video field grabber operative to grab at least one video field including a video image A/D converter operative to digitize a grabbed video field, an object tracker operative to track an object through a plurality of successive video fields, an object highlighter receiving input from the object tracker and operative to highlight the tracked object on each of the plurality of successive video fields, a D/A image converter operative to convert output of the object highlighter into a video standard format, and a video display monitor.

7 Claims, 7 Drawing Sheets

U.S. PATENT DOCUMENTS

| | | | |
|---|---|---|---|
| 5,206,929 | 4/1993 | Langford et al. | 395/159 |
| 5,218,672 | 6/1993 | Morgan et al. | 395/162 |
| 5,264,933 | 11/1993 | Rosser et al. | 348/578 |
| 5,270,820 | 12/1993 | Fellinger | 348/586 |
| 5,280,530 | 1/1994 | Trew et al. | 382/1 |
| 5,353,392 | 10/1994 | Luquet et al. | 348/578 |
| 5,465,308 | 11/1995 | Hutcheson et al. | 382/159 |
| 5,523,783 | 6/1996 | Cho | 348/157 |
| 5,566,251 | 10/1996 | Hanna et al. | 382/284 |
| 5,699,442 | 12/1997 | Fellinger | 382/103 |

SPORTS EVENT VIDEO MANIPULATING SYSTEM FOR HIGHLIGHTING MOVEMENT

This is a continuation of application Ser. No. 08/134,309, filed Oct. 12, 1993 now abandoned, the disclosure of which is herein incorporated by reference.

FIELD OF THE INVENTION

The present invention relates to editing and processing of video segments.

BACKGROUND OF THE INVENTION

Documentation of team games such as basketball, football and soccer on video is useful for coaches and players who view the video film in order to understand their own and opponents' past performance. Sports commentators also view and show video representations of team games in the course of analyzing these games for their viewers. For this purpose, commercially available analog video editors are currently employed, such as Sports-Tech Video Editor (STVE) of Sports-Tech. Inc. of Fort Lauderdale, Fla.

SUMMARY OF THE INVENTION

The present invention seeks to provide a digital sports event video manipulating system which allows a user to manipulate a video representation of a sport event by deriving digital information regarding the sports event from the video representation and manipulating the digital information.

There is thus provided in accordance with a preferred embodiment of the present invention a sports event video manipulating system for manipulating a representation of a sports event, the sports editor including a video field grabber operative to grab at least one video field including a video image A/D converter operative to digitize a grabbed video field, an object tracker operative to track an object through a plurality of successive video fields, an object highlighter receiving input from the object tracker and operative to highlight the tracked object on each of the plurality of successive video fields, a D/A image converter operative to convert output of the object highlighter into a video standard format, and a video display monitor.

Further in accordance with a preferred embodiment of the present invention, the video field grabber is replaced by a video frame grabber.

Still further in accordance with a preferred embodiment of the present invention, the system also includes a marking device allowing a user to indicate an object of interest and providing an output indication of the object of interest to the object tracker.

Still further in accordance with a preferred embodiment of the present invention, the system includes a video editor operatively associated with the video field grabber and with the video display monitor.

Additionally in accordance with a preferred embodiment of the present invention, the object tracker includes an object exiting monitor operative to monitor for exit of an object from at least one video field.

Further in accordance with a preferred embodiment of the present invention, the object tracker is operative to track a plurality of objects.

Still further in accordance with a preferred embodiment of the present invention, the object tracker includes an occlusion predictor operative to predict occlusion of at least one of the plurality of tracked objects by at least one other object.

Additionally in accordance with a preferred embodiment of the present invention, the object tracker includes a moving object identifier operative to identify objects which are in motion at least some of the time as the plurality of objects to be tracked.

Still further in accordance with a preferred embodiment of the present invention, the moving object identifier includes a color analyzer operative to distinguish at least one color characterizing objects at least sometimes in motion from at least one background color characterizing stationary objects.

Additionally in accordance with a preferred embodiment of the present invention, the object tracker includes actual location computation means operative to compute and store an indication of an actual location of a tracked object at an individual time.

Further in accordance with a preferred embodiment of the present invention, the object tracker includes field-of-view direction determining means operative to provide an indication of the actual direction of a current field of view center.

There is also provided, in accordance with another preferred embodiment of the present invention, a video imagery manipulating system for manipulating video imagery including a video field grabber operative to grab at least one video field, an object tracker operative to track an object through a plurality of successive video fields, and an object highlighter receiving input from the object tracker and operative to highlight the tracked object on each of the plurality of successive video fields.

There is also provided, in accordance with another preferred embodiment of the present invention, a sports event video manipulating system for manipulating a representation of a sports event, the sports editor including video field grabber operative to grab at least one video field including a video image A/D converter operative to digitize a grabbed video field, and field mosaic composer operative to receive a plurality of digitized fields from the video field grabber, representing a corresponding plurality of small portions of an arena and to compose a mosaic of fields representing a larger portion of the arena.

Further in accordance with a preferred embodiment of the present invention, the system also includes a field mosaic graphic output system operative to provide a visually sensible representation of the larger portion of the arena.

Still further in accordance with a preferred embodiment of the present invention, the field mosaic graphic output system includes a video display, and a D/A converter operative to convert a digital representation of the field mosaic to a video representation thereof.

Additionally in accordance with a preferred embodiment of the present invention, the field mosaic graphic output system includes a computer screen.

Further in accordance with a preferred embodiment of the present invention, the field mosaic graphic output system includes a printer.

Still further in accordance with a preferred embodiment of the present invention, the video field grabber includes a video frame grabber operative to grab at least one video frame and wherein the A/D converter is operative to digitize a grabbed video frame and wherein the field mosaic composer includes a frame mosaic composer operative to receive a plurality of digitized frames from the video frame grabber and to compose therefrom a mosaic of frames.

Still further in accordance with a preferred embodiment of the present invention, the plurality of small portions are viewed from a corresponding plurality of distances, the differences between at least some of the distances being comparable in size to the distances themselves.

Further in accordance with a preferred embodiment of the present invention, the plurality of small portions are viewed from a single location.

There is also provided, in accordance with another preferred embodiment of the present invention, a sports event video manipulating system for manipulating a representation of a sports event, the sports editor including a video field grabber operative to grab a video field sequence including a video image A/D converter operative to digitize a grabbed video field, and a motion-based foreground-background discriminator operative to differentiate foreground objects in the video field sequence from background in the video field sequence, at least partly on the basis of foreground object motion.

Further in accordance with a preferred embodiment of the present invention, the system includes a field mosaic composer operative to receive a sequence of pluralities of digitized fields from the video field grabber, each plurality of digitized fields representing a corresponding plurality of small portions of an arena and to compose a sequence of mosaics of fields, each mosaic representing a larger portion of the arena and the discriminator is operative to differentiate foreground objects in the sequence of mosaics.

There is also provided, in accordance with a further preferred embodiment of the present invention, a sports event video manipulating system for manipulating a representation of a sports event, the sports editor including a video field grabber operative to grab at least one video field including a video image A/D converter operative to digitize a grabbed video field, and a foreground object shape foreground-background discriminator operative to differentiate foreground objects in the video field from background in the video field, at least partly on the basis of foreground object shape.

There is additionally provided, in accordance with another preferred embodiment of the present invention, a sports event video manipulating system for manipulating a representation of a sports event, the sports editor including a video field grabber operative to grab at least one video field including a video image A/D converter operative to digitize a grabbed video field, and a foreground object shape foreground-background discriminator operative to differentiate a character-bearing foreground object in the video field from background in the video field, at least partly on the basis of character recognition.

Further in accordance with a preferred embodiment of the present invention, the discriminator differentiates foreground objects from background objects at least partly on the basis of color.

Still further in accordance with a preferred embodiment of the present invention, the system includes a foreground object eliminator operative to eliminate foreground objects and replace them with adjacent background information.

Further in accordance with a preferred embodiment of the present invention, the system also includes a selected object replacer operative to identify a selected object and to replace the selected object with an icon in the mosaic.

Still further in accordance with a preferred embodiment of the present invention, the video indexing method includes the steps of providing a digital representation of a video sequence featuring at least one object performing at least one type of action, and indexing the video sequence according to at least one index.

Further in accordance with a preferred embodiment of the present invention, the step of indexing includes the step of indexing according to the identity of the object.

Still further in accordance with a preferred embodiment of the present invention, the step of indexing includes the step of indexing by action type.

Additionally in accordance with a preferred embodiment of the present invention, the video sequence represents a sports event and the step of indexing according to the identity of the object includes the step of indexing according to the identity of at least one player participating in at least a portion of the sports event.

Still further in accordance with a preferred embodiment of the present invention, the step of indexing includes the step of indexing according to the identity of a team participating in the sports event.

Additionally in accordance with a preferred embodiment of the present invention, the step of indexing includes the step of indexing according to the following group of action types: offense, and defense.

Further in accordance with a preferred embodiment of the present invention, the step of indexing includes the steps of receiving at least one audio signal corresponding to at least one frame of the video sequence, and keyword spotting the audio signal for indices in order to index the video sequence in accordance with detected indices.

Further in accordance with a preferred embodiment of the present invention, the step of receiving includes the step of receiving the audio channel of the video sequence.

Still further in accordance with a preferred embodiment of the present invention, the step of receiving includes the step of receiving an audio message from a user indicating an index.

Additionally in accordance with a preferred embodiment of the present invention, the foreground object shape discriminator includes a ball recognizer operative to recognize a ball.

Further in accordance with a preferred embodiment of the present invention, the discriminator includes a team uniform recognizer operative to recognize member of a sports team by at least one characteristic of his uniform.

There is also provided, in accordance with another preferred embodiment of the present invention, a television sports event replay method including the steps of receiving a video sequence of at least a portion of a sports event featuring at least one object in action, selecting at least one of the objects in action, tracking the selected objects through the video sequence, and broadcasting a replay of the video sequence on television with the selected objects highlighted.

There is also provided, in accordance with another preferred embodiment of the present invention, a television sports event replay method including the steps of receiving a video sequence of a sports event segment, featuring at least one object in action, wherein first and second portions of the segment takes place in first and second portions of the playing field, respectively and the second and first portions are not visible in the video representation of the first and second portions, respectively, of the sports event, and broadcasting on television a representation of the sports event segment in which the first and second portions of the playing field constantly appear.

Further in accordance with a preferred embodiment of the present invention, the object highlighter is operative to draw the past trajectory of at least one tracked object.

There is also provided, in accordance with another preferred embodiment of the present invention, a sports event video manipulating method for manipulating a representation of a sports event, the method including grabbing and digitizing at least one video field, tracking an object through a plurality of successive video fields, receiving input from the object tracker and highlighting the tracked object on each of the plurality of successive video fields, and converting output of the object highlighter into a video standard format.

There is also provided, in accordance with another preferred embodiment of the present invention, a video imagery manipulating method for manipulating video imagery including grabbing at least one video field, tracking an object through a plurality of successive video fields, and receiving input from the object tracker and highlighting the tracked object on each of the plurality of successive video fields.

There is also provided, in accordance with another preferred embodiment of the present invention, a sports event video manipulating method for manipulating a representation of a sports event, the method including grabbing and digitizing at least one video field, and receiving a plurality of digitized fields from the video field grabber, representing a corresponding plurality of small portions of an arena and composing a mosaic of fields representing a larger portion of the arena.

There is also provided, in accordance with another preferred embodiment of the present invention, a sports event video manipulating method for manipulating a representation of a sports event, the method including grabbing and digitizing a video field sequence, and differentiating foreground objects in the video field sequence from background in the video field sequence, at least partly on the basis of foreground object motion.

There is also provided, in accordance with another preferred embodiment of the present invention, a sports event video manipulating method for manipulating a representation of a sports event, the method including grabbing and digitizing at least one video field, and differentiating foreground objects in the video field from background in the video field, at least partly on the basis of foreground object shape.

There is also provided, in accordance with another preferred embodiment of the present invention, a sports event video manipulating method for manipulating a representation of a sports event, the method including grabbing and digitizing at least one video field, and differentiating a character-bearing foreground object in the video field from background in the video field, at least partly on the basis of character recognition.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

The role of video to analyze certain team games such as basketball, football and soccer, is rapidly growing. Using video allows both coaches and players to visualize what the players have done right, what they have done wrong and where they must improve. From a coaching standpoint it helps in preparing game strategies against different opponents.

In addition to pre-game analysis of opponent scouting tapes and post-game analysis for self improvement, there is also need for a fast editing and analysis tool for half-time situations to allow the coaches to make strategy adjustments during halftime.

There is also a growing need for sport commentator demonstration tools in TV studios. These are needed to educate the viewers, to show them the various strategies and typical moves and exercises of the game in order to increase their interest and ultimately to increase the ratings of the program and the station.

Advertising messages or sponsorship logos superimposed on such diagnostic screens or clips are very effective since they are usually displayed after an important tactic in the game.

Figure 1:
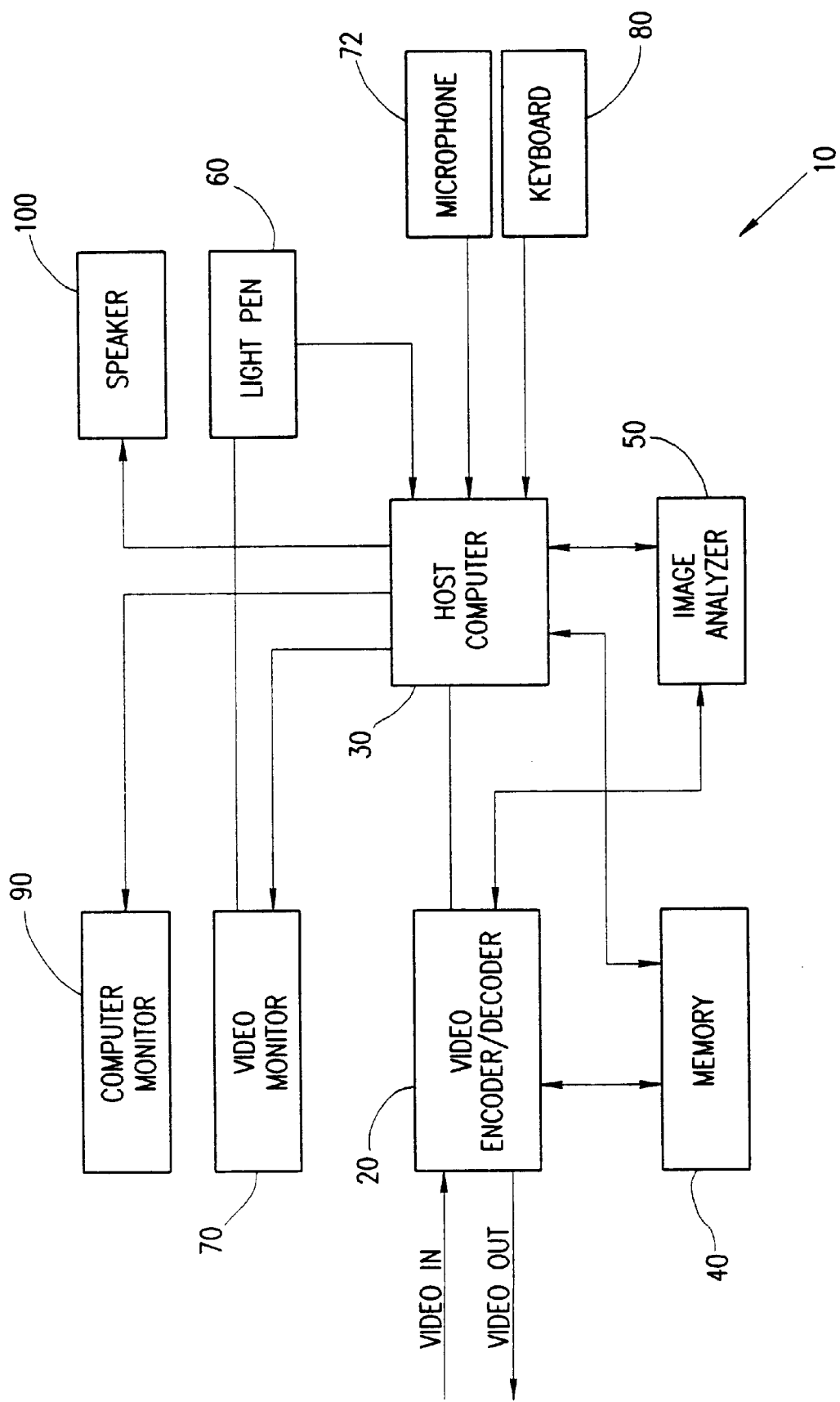
FIG. 1 is a simplified block diagram of a sports event analysis system which is constructed and operative in accordance with a preferred embodiment of the present invention.

Before proceeding with a description of the apparatus depicted in FIG. 1, the following comments are pertinent: The uses of the apparatus and method relate to video editing and include but are not limited to analysis of video clips captured during sports games. The apparatus of this invention may include, or operate in conjunction with, a general purpose video editing machine.

The embodiments described below refer, but are not limited to digital video editing systems and can include, or operate in conjunction with analog video editors as well.

Reference is now made to FIG. 1 which illustrates a sports event analysis system, referenced generally 10, including a video encoding/decoding unit 20, a host computer 30, a digital memory storing device 40, an image analyzer 50, an annotation aid such as a lightpen 60 and a video monitor 70.

The system 10 is operative to perform editing, analysis and diagnostic representations of video segments of sports events. The video encoder/decoder unit 20, such as an Optibase JPEG-2000, is operative to grab and digitize a sequence of individual frames from the color video input, preferably in real-time (25 or 30 frames per second), and to convert a digital image back into analog video.

This unit is preferably able to compress and decompress the video images so that longer video segments may be stored in the digital memory 40. The Optibase JPG-2000 board is using Motion JPEG algorithm for compression; other algorithms, such as MPEG, may also be used.

The video encoder/decoder receives the video input from a plurality of optional sources such as a Video Cassette player (VC), a Video Disk player (VD) or broadcasted transmission and also outputs live video. The frame grabber can grab and digitize a full frame or preferably, due to camera scanning and players movements, to operate on single fields.

Host computer 30 may comprise a pc 486DX-50 with 8 MB RAM. The host computer preferably includes an audio board, installed into one of the extension slots, that can store and synchronize at least one audio channel and may also include a user dependent or user independent key-word spotting unit. The computer preferably communicates with the following units:

a. video monitor 70 which may comprise a JVC 21" RGB/YC/PAL;
b. an edit monitor 90 such as a SVGA 14" non-interlaced low radiation monitor;
c. one or more user input devices which may, for example, include light pen 60, microphone 72 and a keyboard 80;
d. one or more user output devices which may, for example, include stereo speakers 100;
e. digital memory storage device 40 which may comprise 2 GigaBytes SCSI Hard Disk; and
f. image analysis, tracking and registration unit 50, also termed herein "image analyzer 50", which is operative to analyze and manipulate a sequence of digital images and to create diagnostic or processed output that can be displayed on the video monitor 70 and/or sent into the output video port.

The image analyzer 50 preferably comprises at least one dedicated electronic board that is installed in the host computer extension slots and communicates with its bus. The image analyzer 50 operates on the spread image or rather makes use of the compressed data associated with the spread image.

The system of FIG. 1 is preferably operative to perform a plurality of types of analysis, manipulation and editing operations on a video representation of a sports event, such as but not limited to the following operations:

a. Control of the video input device—the VD or VC input is remotely controlled from the computer screen. The operator may use a plurality of control functions such as: fast forward, fast search backwards, play (no compression), record 20 (go back 20 seconds, compress and store on disk), stop.
b. Indexing video segments—the operator can quickly mark start and end points of relevant video segments in PLAY mode. This is preferably done using means such as a light pen, touch screen or a trackball. It may also be implemented using the audio channel—the operator says keywords describing the video segment into the microphone and the system later uses an audio keyword spotting unit (for example, a user dependent speech recognition pc board) to locate the clip in the synchronized audio channel.

Figure 2:
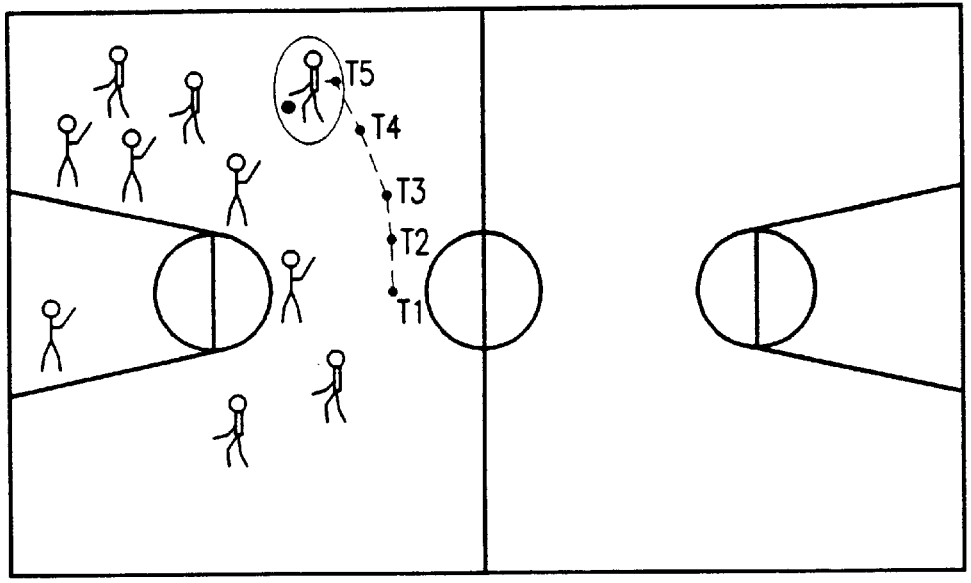
FIG. 2 is a sample display of a video frame including a highlighted player and an indication of the past trajectory of the highlighted player.
Figure 4:
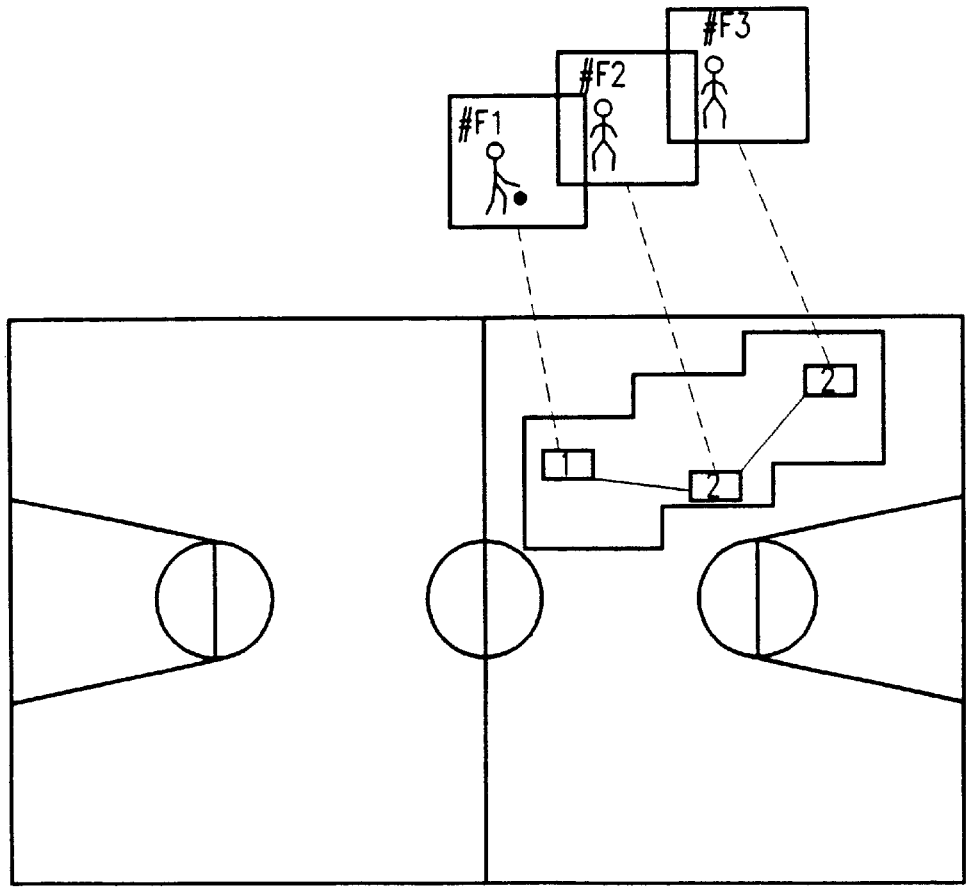
FIG. 4 is a pictorial illustration of conversion of a sequence of narrow-field partially overlapping frames into a single image with a wide field of view.

The segments are indexed according to any suitable criteria, preferably user-selected criteria, such as but not limited to type of offensive exercise, defense type, identified player habits, and then logged into the memory. All segments having the same index can later be accumulated for editing, analysis and sorting out.

c. On-line graphical blending and audio dubbing—when recording a video segment into system memory the operator can add graphical overlays on the video for example by directly "writing" on the screen with a light pen or by adding a vocal description using the microphone.
d. Editing and sorting indexed video segments—the operator may perform a plurality of editing operations on each indexed segment such as but not limited to changing start/stop points, deleting clips and adding graphical overlays or animation clips. He may then create groups of segments to be later recorded on video cassettes and distributed among the players.
e. Spotting key-words on the original audio channel of the video input such as players' names, to automatically accumulate the video segments associated with these players. This preferably utilizes a key-word spotting system; a speaker dependent key-word spotter demands a training phase before running each cassette.
f. Automatic tracking and highlighting of objects selected on a first frame of a segment throughout the sequence of frames composing an event until the objects get out of the camera field of view as illustrated by way of example in FIG. 2. A past trajectory of the objects may be superimposed on the video as also depicted in FIG. 2.
g. Creation of a wide field of view (FOV) background image of the playing fields by mosaicking partially overlapping narrow FOV consecutive frames, automatic placing of players and production of analysis video segments "played" on the global playing fields image as shown in FIG. 4. These video clips may later be edited and sorted as all others.

A preferred method of employing the system of FIG. 1 to perform operation f is as follows:

Each frame of the input video stream is grabbed, digitized and preferably compressed by the video encoder/decoder unit 20. Objects are marked on the first frame of the video stream by the system operator preferably by using the light pen 60. The digital frame information is typically stored in memory 40 and can be accessed and spread by the decoder 20. The frame pixels data is then DMAed by means of a fast video bus into the image analyzer 50 that uses a real-time motion estimation chip such as SGS-THOMSON ST13220 and a dedicated circuit to estimate the motion and to track the marked objects of interest and to estimate the motion of background windows at video rate.

A graphical object enhancement overlay is then created and stored on the hard disk memory 40. When the operator wishes to record the sequence on a VCR the frames are decoded in unit 20 and the corresponding graphical overlays are superimposed on each frame. The composed image is then analog converted and sent to the video output port.

A preferred method of employing the system of FIG. 1 to perform operation g is similar to that described for operation f except that the image analyzer 50 is now used to perform registration of the current frame into the previous ones and to generate the global diagnostic still image or video clip. The light pen 60 is used here also to manually "paint" the residual "holes" in the background global image in addition to marking objects of interest in the first frame of the replayed set.

FIG. 2 is a sample display of a video frame including a highlighted player and an indication of the past trajectory of the highlighted player.

Figure 3A:
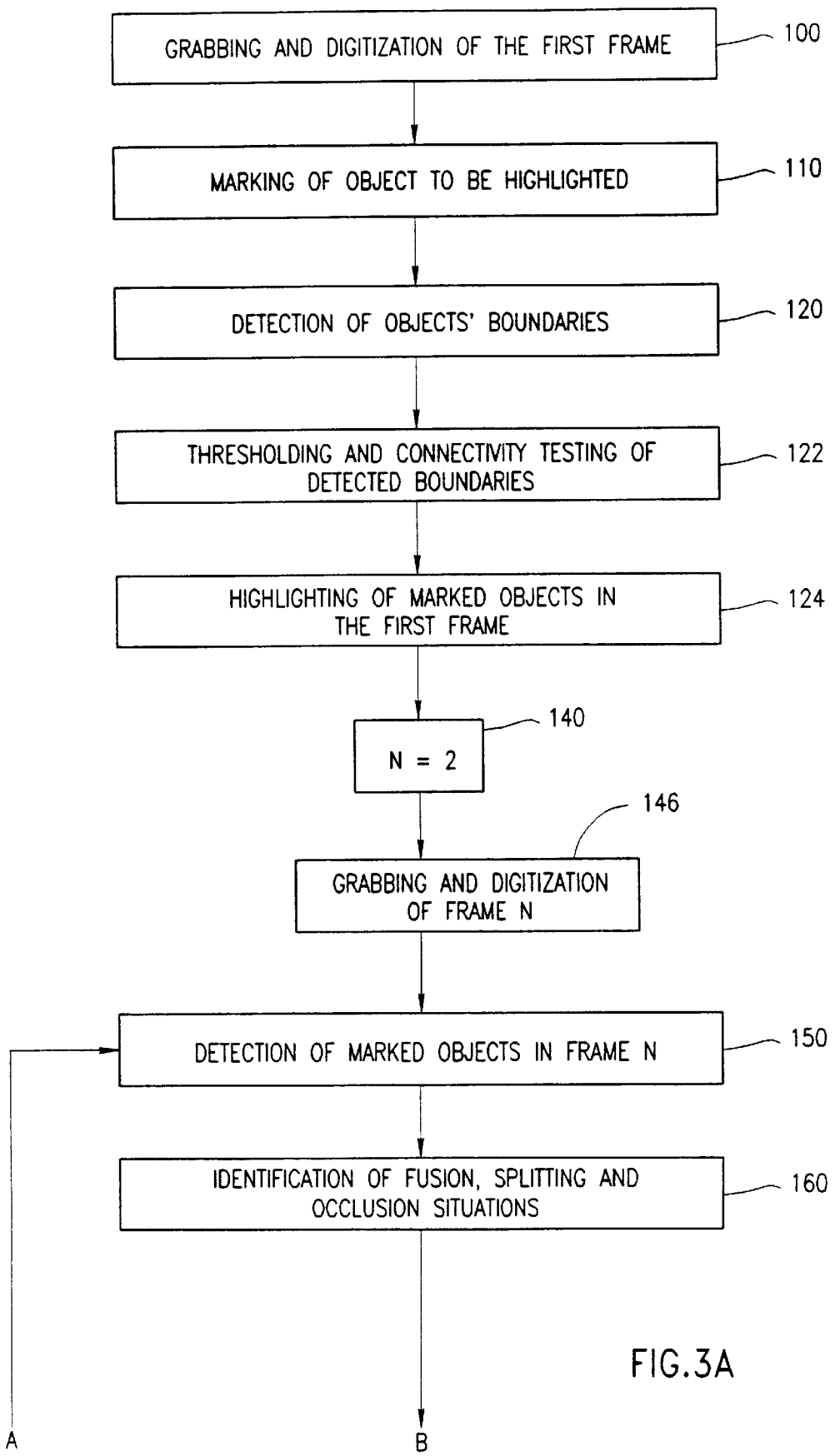
FIGS. 3A and 3B, taken together, form a simplified flowchart of a preferred method for highlighting a video representation of an object included in a video representation of a scene.
Figure 3B:
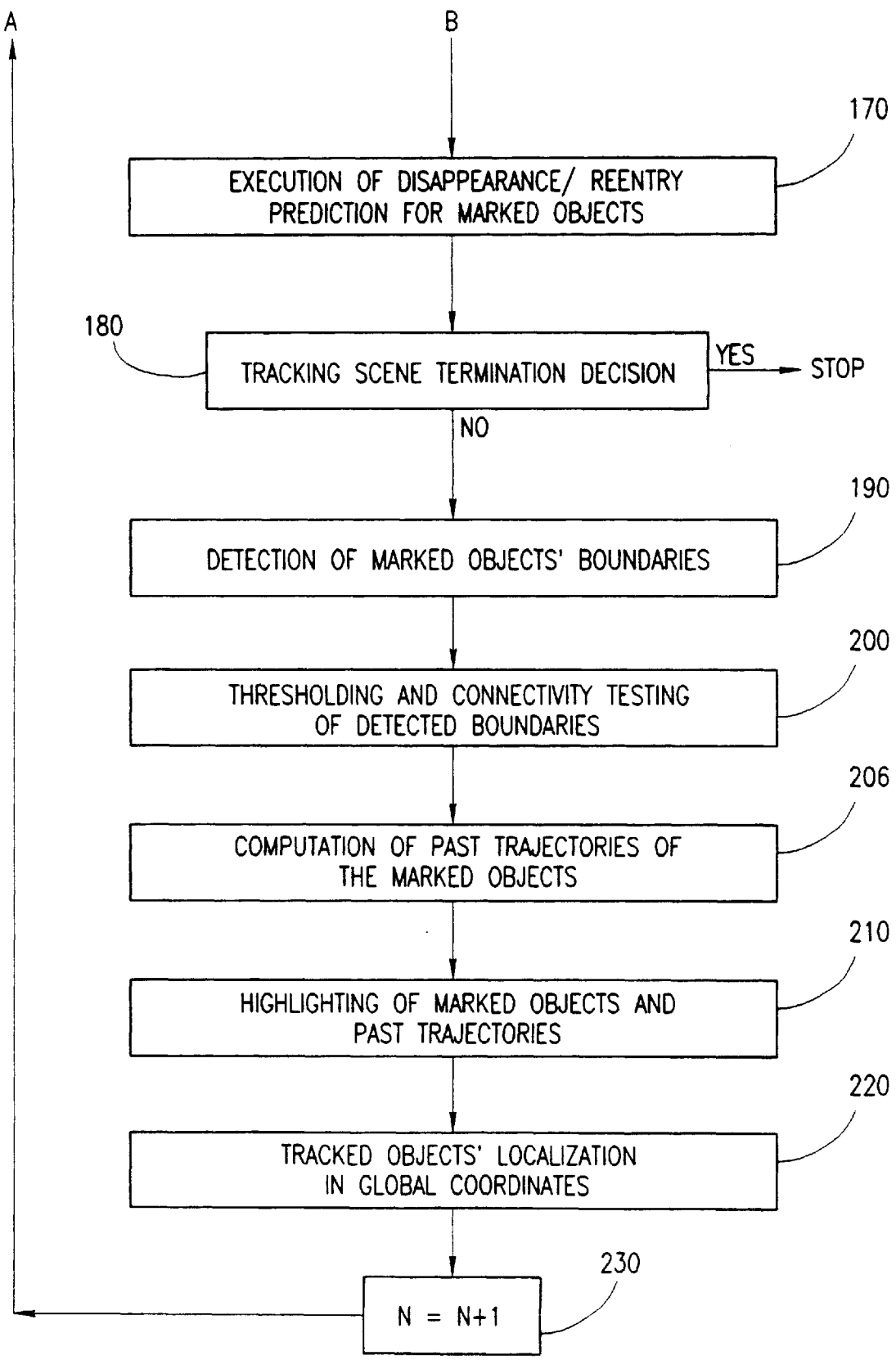

Reference is now made to FIGS. 3A and 3B which, taken together, form a simplified flowchart of a preferred method for highlighting a video representation of an object included in a sequence of video representations of an event, such as a sport event, which may be performed by units 30 and 50 of FIG. 1.

In step 100 the video encoder 20 grabs and digitizes the first video frame.

In step 110, the system accepts a user's indication of at least one object to be highlighted. For example, the user may indicate an object by touching its image on the first video frame of the sequence with light pen 60 of FIG. 1.

In step 120, the video analyzer 50 of FIG. 1 detects and identifies the boundaries of the selected objects, using a conventional edge detection method. For example, Gaussian edge detection, as described in the following publication, has been found to be suitable:

J. F. Canny, "A computational approach to edge detection", IEEE Trans. Pattern Analysis and Machine Intelligence, vol. 8, pp. 679–698, November 1986.

The disclosure of the above-referenced publication and of all publications cited therewithin is hereby incorporated by reference.

Alternatively, however, other conventional edge detection methods may be employed such as those described in the following references:

F. M. Dickley and K. M. Shanmugan, "An optimal frequency domain filter for edge detection in digital pictures", IEEE Transactions on Pattern Analysis and Machine Intelligence, PAMI-1(1):37–49, 1977.

R. M. Haralick, "Digital step edge from zero-crossings of second directional derivatives", IEEE Transactions on Pattern Analysis and Machine Intelligence, PAMI-6(1):58–68, 1984.

D. Marr and H. Hildreth, "Theory of edge detection", Proceedings of the Royal Society of London, B(207):187–217, 1980.

The disclosures of the above-referenced publications and of all publications cited therewithin are hereby incorporated by reference.

A problem that has been encountered and identified as a possible obstacle to the edge detection task is image degradation due to motion induced blur. This may be due either to camera scanning or to object motion. The motion blur identification technique such as the ones described in the following reference may be used as part of step 120 in FIG. 3A:

R. C. Gonzalez and P. Wintz, "Digital image processing", Addison-Wesley, 1977.

In step 122 all edge pixels with an edge strength below a user-specified threshold are ignored. All those above are marked as candidate boundary pixels. Connected sequences of candidate boundary pixels ("strings") are then identified. A connected sequence is defined as the set of boundary pixels such that a path consisting solely of boundary pixels exists between any two pixels in the set. Strings which are very close to one another are connected. At this point, just one connected string normally exists for each marked object which is guaranteed to completely surround a "central region" of the object.

In step 124, objects whose connected strip of edges was detected and defined in steps 120 and 122 are highlighted in the initial frame viewed by the user in the course of performing step 110.

In step 140, a frame index n is initialized to 2, since forthcoming steps 150–230 are performed for each video frame from the second frame, i.e. the frame following the initial frame which the user employed in performing step 110, onward.

In step 146, the video encoder 20 grabs and digitizes the n'th frame.

In step 150, a tracking technique is employed to detect, in frame n, the objects marked in step 110. The boundaries of the marked objects detected on the first video frame of the session, or in the previous frame, are used to track the object throughout the succession of frames using the method of edge tracking. This is done by defining a dynamical search window centered around the object location in the previous frame and performing the edge detection procedure inside this window.

From the third frame on, the direction of the relative motion of the object may be predicted and the search window may then be centered on the predicted point. The first step in edge tracking applies one of the known edge detection algorithms mentioned above.

The next steps are thresholding and continuity processes, as described above. Alternatively, the above tracking method may be replaced by the following method: when the object is large enough to embody well defined correlation windows or features, the tracking may be executed by correlating such windows, taken from subsequent frames.

For objects typically characterized by a bounding rectangle larger than 10×10 pixels, reliable feature detection is expected and the correlation tracking method usually has a better probability of success than the edge tracking technique. A combination of these tracking methods and others may also be used. The tracking procedure takes into account the fact that there may be a change of magnification (zoom in and out) and of objects' poses through the succession of frames.

In step 160, the system analyses and detects the following situations:

"fusion"—two or more objects which have merged into one;
"splitting"—one "fused" object which has split into at least two separated objects;
occlusion—an object which is partially blocked by another object (player, referee or by the ball).

Two approaches may be implemented to identify these phenomena:

a. The internal region of a marked object is matched, by means of a pixel correlation method, to the same region in the previous frame. When a large local mismatch is identified it may be due to occlusion or fusion. The pixel correlation image should first be smoothed to cancel noise.

b. All moving objects in the scene (players, referees and the ball) are continuously detected and tracked from frame to frame. If occlusion of a marked object, by one of the players or by the ball, occurs, fusion and splitting may then be predicted. A method for distinguishing between a uniformly moving background and foreground objects moving in different velocities is described below with reference to steps 350–370 of FIG. 5A.

In step 170, the system, after detection and localization of all tracked objects, executes a "disappearance analysis" to monitor all objects that have exited the camera field of view and those that are predicted, according to their computed angular speed, to exit the field of view in the forthcoming frames.

Along with the exiting monitoring, a reentry analysis is performed to identify those marked and previously-tracked objects that have disappeared but have reentered the scene (i.e., the camera field of view) in the current frame.

The probability of success of the reentry analysis is lower than the probability of success of disappearance analysis.

The method used for the reentry analysis preferably includes the following steps:

1) keeping an inventory of the global coordinates of exiting objects at the moment of their exit. The computation of the global coordinates of a given pixel of frame n is described with reference to steps 340–380 of FIG. 5A.

2) prediction of the location of the objects in global coordinates based on their last computed velocity vector.

3) conversion of the predicted object location from the global coordinates into reentry frame coordinates.

In step 180, the program decides, according to a predefined criterion, if the number of marked objects in the field of view is sufficient to continue the process into the following frames. When the number of objects has decreased below a given threshold it becomes reasonable to assume that the set has degenerated into an insignificant scene and the program terminates. It is still under the operator's discretion to reactivate the code from the termination point on.

Typically, in steps 190 and 200, the boundaries of the tracked objects in frame n are defined. Sometimes these boundaries have already been defined, e.g. in step 150, when edge tracking has been used. The edge strength of the boundaries is thresholded according to a pre-defined criterion, connected sequences of candidate boundary pixels are identified, strings which are very close to one another are connected and the main connected string, guaranteed to enclose a central region, is identified.

In step 206 the past trajectories of the marked objects on the current frame are computed. This process involves computation of each object's centroid (or any other reference point) in previous frames and conversion into current frame coordinates through the global frame of reference, as explained in step 450 of FIG. 5B.

In step 210 the marked objects that have been tracked are highlighted.

The term "highlighting" is used herein to refer to any suitable emphasis of an individual object in a display, or of a portion of an individual object, such as, but not limited to, its boundary, as detected and defined in step 200, or to a manipulation of the object or object portion such as color change, shadowing, blinking, or adding an emphasizing element such as a framing element surrounding the object, an arrow continuously pointing at the object, a caption appropriate to the object which travels continuously along therewith. Proper measures to prevent edge and texture aliasing are taken when applying any part of these dynamic emphasizing techniques.

The previously computed past trajectories of the marked objects may also be superimposed on the video frame in step 210.

In step 220, the localization of objects of interest in the global coordinate system, required for the reentry analysis is executed.

In step 230 the frame number is advanced and the highlighting process is repeated.

A problem usually encountered in the analysis of team games is the difficulty in conceptualizing a whole wide field of view of an offensive or defensive tactic out of the succession of partially overlapping video frames that were captured by at least one TV camera using relatively narrow fields of view centering around the instantaneous location of the ball and active players.

The system of the present invention is preferably characterized in that one large pseudo-real image of the playing fields, or a relatively large portion of thereof, is mosaiced from among the successive partially overlapping video frames generated by the camera in the course of the event.

The frames are first composed in mosaic fashion to create a global background image onto which the active players and the ball are placed in their accurate locations using their real images or graphical icons, thus demonstrating a comprehensive representation of all the moves composing the event and allowing better understanding of the event.

FIG. 4 is a pictorial illustration of conversion of a sequence of narrow-field partially overlapping frames into a single image with a wide field of view.

Figure 5A:
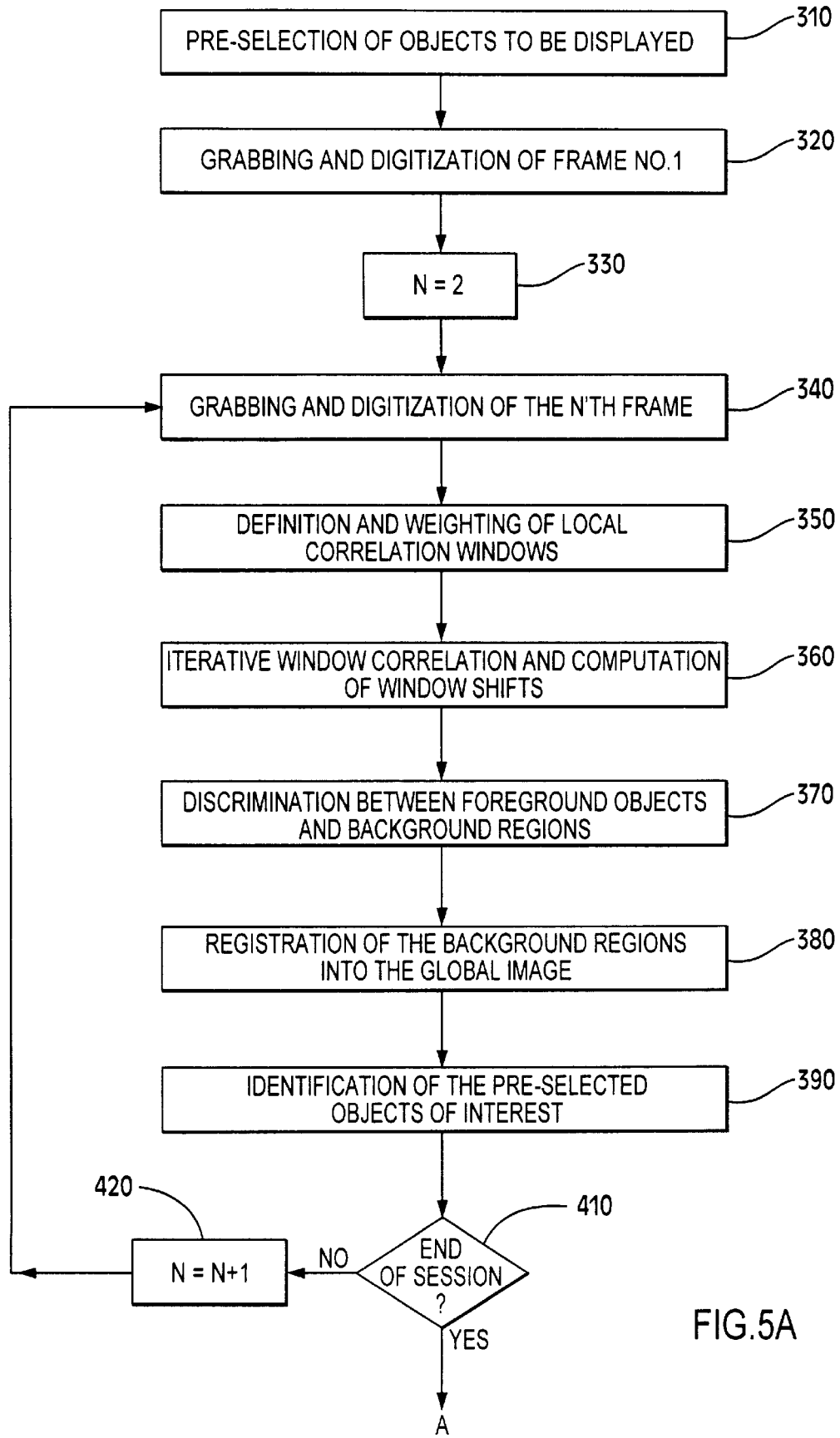
FIGS. 5A and 5B, taken together, form a simplified flow-chart of a preferred method for generating a global diagnostic image.
Figure 5B:
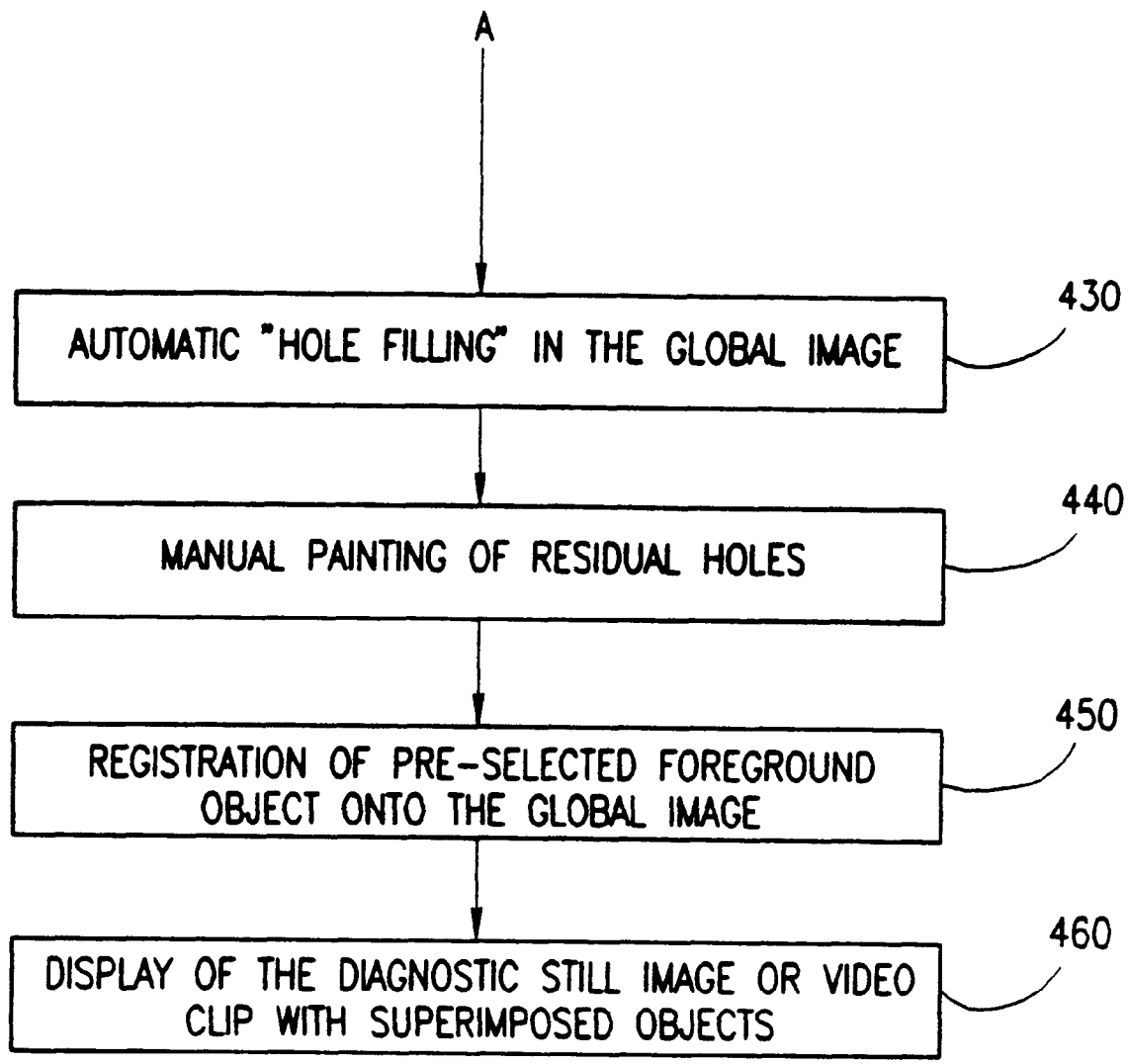

Reference is now made to FIGS. 5A and 5B which, taken together, form a simplified flowchart of a preferred method for generating this global diagnostic image which may be performed by the image analyzer 50 and host computer 30 of FIG. 1.

In optional step 310, the operator manually selects the objects of interest whose performance he wants to analyze through the replayed set. This is done using an annotation aid such as a light pen or a mouse. When this step is omitted, the system preferably considers all subsequently identified foreground objects in the image as objects of interest.

It is also possible that the system will automatically classify detected foreground objects according to their colors, identified back numbers of players, geometrical shape (for example, the round shape of a ball) and/or other attributes and will select a subset of foreground objects to be defined as objects of interest.

Although the main implementation of this method will be during replay situations, it is possible to employ the method in the real time of the event. In such cases the automatic selection of objects of interest is normally a necessity.

In step 320, the first frame or first field is grabbed by the video encoder 20, digitized and, optionally, compressed to serve as a seed for the global image.

In step 330, a frame index n is initialized to 2, since forthcoming steps 340–450 are performed for each video frame from the second frame, i.e. the frame following the initial frame which the user employed in performing step 310, onward.

In step 340, the nth video frame is grabbed, digitized and, optionally, compressed by the unit 20.

In step 350, the area of the frame is divided into a large number, typically 100, of separate contiguous small window areas. The windows are then classified and each of them is given a weight representing its information content. In step 360, the correlation value (or another value such as the sum of absolute differences) of each window of frame n with the corresponding window in the (n−1)'th frame for each point inside a given search window, is computed.

The matrix of correlation values is then fitted to a 2-d polynomial to achieve the minimum value with sub-pixel accuracy. The vector motion associated with each correlation window is then computed from the measured shift and frame periods.

The average value, considered the "majority motion" velocity, is then computed. The deviating windows are excluded and the global motion is remeasured. This process is iteratively continued until convergence is achieved. In each iteration, smaller window sizes may be used to obtain a better spatial resolution.

In step 370, the local window shift information is used to distinguish between foreground objects, i.e. moving objects, and background regions in the image which have the "majority motion" velocity that is usually due to camera scanning.

In step 380, the identified "background regions" of frame n are registered into the (n−1)'th frame. Since this is done successively on all frames composing the event, a "global" wide field of view (FOV) background image is incrementally composed in mosaic fashion from the narrow FOV partially overlapping frames. The warping process is executed using proper averaging since contributions to a given pixel in the global image may come from more than one frame due to the large overlap between successive frames.

In step 390, the system defines a subset of identified foreground objects in the current frame that are objects of interest selected, either automatically or by the user in the first frame. This is executed using one of the methods of step 150 of FIG. 3.

The information pertaining to the identity and locations of the centroids or other reference points, strings or matrices of pixels belonging to these identified objects of interest, are then computed in the local frame and global image coordinate systems. This information is stored for later use.

In step 410, an "end of session" decision is taken by the system. The criterion for such a decision may be a pre-programmed point of time or frame number, a major failure of the windows correlation mechanism, sometimes indicating a "cut" initiated by the TV producer, or a situation in which the number of identified objects of interest in the camera FOV has decreased to a value below a pre-programmed threshold. When "end of session" is declared the program stops the flow of video frames and continues with steps 430–460 of FIG. 5B.

In step 420, the system advances the frame number by one and repeats steps 340–410 for the new frame.

In step 430, the system performs an automatic "hole filling" process on the global image mosaic. As described above, each pixel in each frame is classified as a background or foreground pixel. If it is a background pixel, it is used to update the corresponding pixel of the global image when added with the proper weighting. If the pixel is classified as a "foreground pixel", its value is ignored. The probability that a given background pixel of the global image will be occluded with foreground objects through the whole succession of overlapping frames is typically low but non-zero, and the existence of consequent "holes" in the global image cannot, therefore, be ruled out.

In step 430 these holes are automatically "filled" using spatial averages of neighboring pixel values.

In step 440, the user optionally paints any residual holes which may remain after the execution of automatic hole painting step 430.

This may be effected using annotation aid 60 and standard graphics software. At this point, the user may also "eliminate" residual foreground objects that have not been discriminated by the automatic process, such as stationary players.

In step 450, the system registers the identified objects of interest, whose global coordinates have been computed for each frame in step 390, on the global background image at various time points. The system may automatically display all the objects or enable the operator to select only a few objects to be displayed on the diagnostic screen.

In step 460, the system displays the diagnostic image or video clip on the video monitor 70, the computer monitor 90, and/or sorts it into the video output port of unit 20 for recording or transmission. At least the following display options of the diagnosis information are preferably provided:

a. Icons of the objects of interest, typically including players and a ball, are superimposed on the global background image at each selected point of time and the temporal evolution of the set is displayed in a film-like manner.

b. The images of the objects of interest themselves are superimposed and the time evolution is displayed as a video clip resembling the original video output except for the two following differences:
   1. the background is a wide angle view embodying a substantial portion of the playing fields thereby to orient a spectator in the field and to afford the spectator a better understanding of the tactical moves.
   2. players that did not take part in the set are "eliminated" so that the spectators' attention is focused on the active players.

c. Trajectories of players and/or ball may also be automatically displayed with optional time marking points.

d. Still images summarizing the entire event by superimposing acts that occurred at different time points on the same global background image.

Figure 6A:
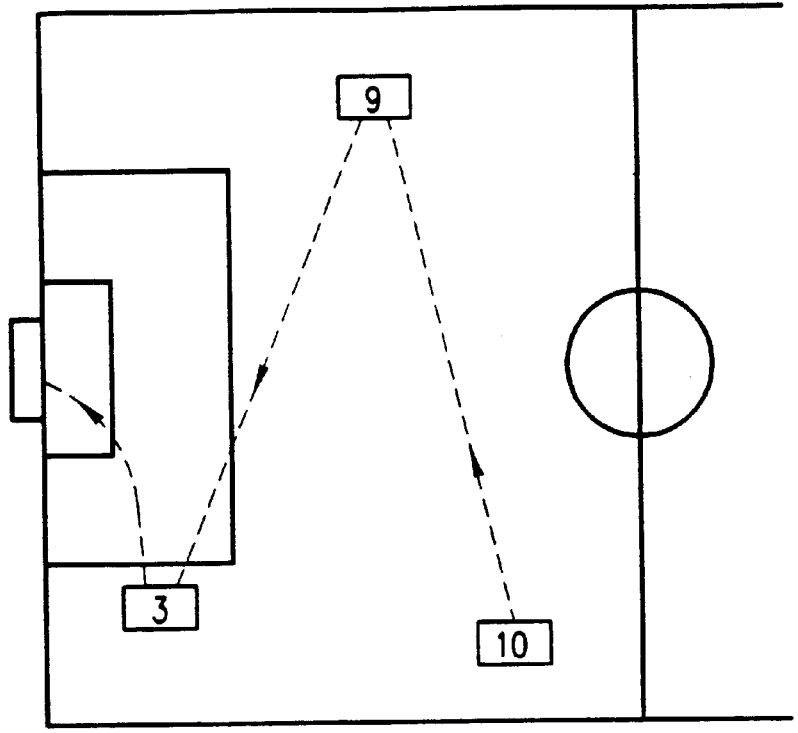
FIGS. 6A and 6B are two sample video frames illustrating two options for diagnosis offensive sets in a soccer game.
Figure 6B:
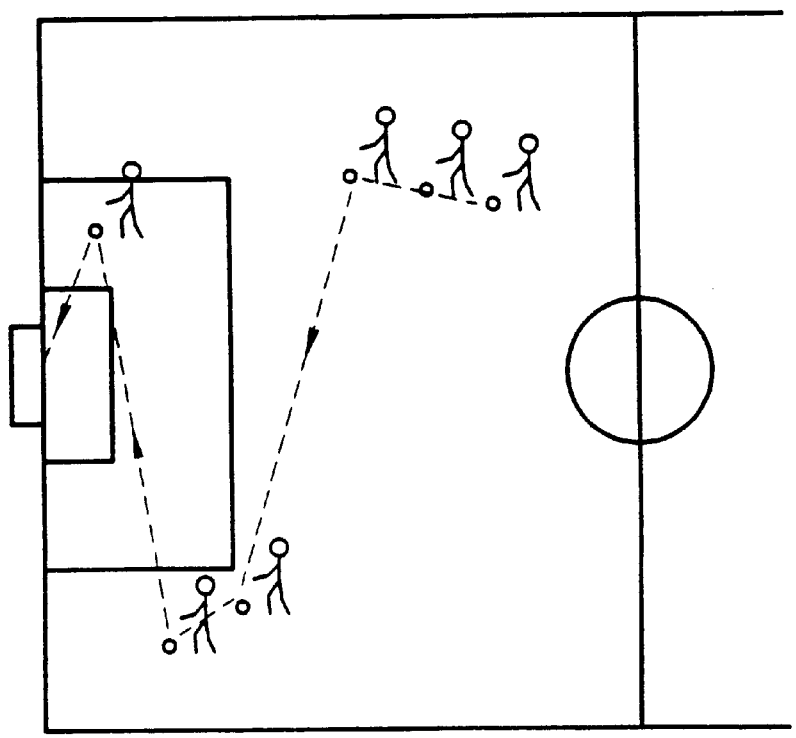

Reference is now made to FIGS. 6A and 6B that represent two sample video frames illustrating two optional display formats of diagnostic still images in a soccer game pertaining to option d. above.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

In all embodiments shown and described hereinabove, either frames or individual fields may be manipulated, according to alternative embodiments of the invention. Preferably, individual fields are manipulated.

It will be appreciated by persons skilled in the art that the present invention is not limited to what has been particularly shown and described hereinabove. Rather, the scope of the present invention is defined only by the claims that follow:

We claim:

1. A sports event video manipulating system for manipulating a video representation of a sports event, the system comprising:
   a video field grabber operative to grab at least one video field including a video image A/D converter operative to digitize a grabbed video field;
   a moving object tracker operative to track a moving object through a plurality of successive video fields, comprising; (i) a means for defining a dynamical search window that is centered around an object location in the previous video frame, (ii) a means for estimating the direction of relative motion of the dynamical search window relative to the motion of the object from the previous video frame to the present video frame, and (iii) an edge detection means for detecting the object to be tracked within the search window;
   a moving object highlighter receiving input from the moving object tracker and operative to highlight the tracked moving object within the dynamical search window on each of the plurality of successive video fields by adding to a visual image of the object in each video field as seen by a viewer a highlight to identify to the viewer the object being tracked;
   a D/A image converter operative to convert output of the moving object highlighter into a video standard format; and
   a video display monitor.

2. The system according to claim 1, wherein said moving object tracker is operative to track a plurality of moving objects and said moving object tracker includes an occlusion predictor operative to predict occlusion of at least one of the plurality of tracked moving objects by at least one other object.

3. The system according to claim 1, wherein said moving object tracker is operative to track a moving object through said plurality of successive video fields even when said moving object changes its size, shape and orientation in successive video fields.

4. A television sports event replay method comprising the steps of:
   tracking a moving object with a moving object tracker, that is operative to track a moving object through a plurality of successive video fields, by defining a dynamical search window that is centered around an object location of the moving object in a previous video frame, (ii) estimating the direction of relative motion of the search window relative to the motion of the object from the previous video frame to the present video frame, and (iii) detecting the object to be tracked in the present video frame within the search window with an edge detection means;

storing in a computer memory a video representation of the plurality of successive video fields, the plurality of successive video fields being generated by a video camera and featuring, the moving object being tracked in action with the dynamical search window in the previous video frame and the present video frame, the previous video frame including a first temporal position and the present video frame including a second temporal position, the first and the second temporal portions comprising successive partially overlapping video frames generated by the camera and taking place in a first and a second spatial portion of the playing field, respectively and the second and first spatial portions of the playing field not being visible in the video representation of the first and second temporal portions, respectively, of the plurality of successive video fields; and broadcasting on television a representation of the plurality of successive video fields, including the previous video frame and the present video frame, as a mosaic of partially overlapping video frames in which the tracked moving object is displayed in each of the successive video fields.

5. A sports event video manipulating system for manipulating a video representation of a sports event, the system comprising:

a video field grabber operative to grab at least one video field including a video image A/D converter operative to digitize the grabbed video field;

a moving object tracker operative to track a moving object through a plurality of successive video fields, comprising: (i) a means for defining a dynamical search window that is centered around an object location in the previous video frame, (ii) a means for estimating the direction of relative motion of the dynamical search window relative to the motion of the object from the previous video frame to the present video frame, and (iii) an edge detection means for detecting the object to be tracked within the search window;

a moving object highlighter receiving input from the moving object tracker and operative to highlight within the dynamical search window, the object being tracked by the moving object tracker on each of the plurality of successive video fields;

a D/A image converter operative to convert output of the moving object highlighter into a video standard format; and a video display monitor for displaying the object highlighted by the moving object highlighter.

6. A sports event video manipulating system as claimed in claim 5, including a means for creating a graphical enhancement overlay comprising a framing element surrounding each tracked object and a means for varying the size of the framing element to correspond to the size of the tracked object as viewed on the video display monitor.

7. A sports event manipulating system as claimed in claim 6, further comprising a means for attaching an appropriate caption to the tracked object in each video frame.

* * * * *